# 2,726,980

INSECT REPELLANT AMINES PRODUCED BY REACTING 1,3-BUTADIENE AND AMMONIA AND METHOD OF USING SAME

Lyle D. Goodhue, Bartlesville, Okla., and Carolyn E. Tissol, St. Paul, Minn., assignors to Phillips Petroleum Company, a corporation of Delaware No Drawing. Application April 9, 1952,
Serial No. 281,468

3 Claims. (Cl. 167—22)

This invention relates to the repelling of insects from a situs with which contact of the insect is to be prevented. Thus, although the repellent of the method of the invention can be applied to the situs from which the insect is to be repelled, it is important to note that the repellent can also be applied to a situs adjacent that from which the insect is to be repelled. Thus, the repellent method of the invention will function without actual physical contact with either the insect or the situs from which it is to be repelled. Therefore, it is especially noted that whether the repellent possesses insecticidal properties is not the deciding factor and that repelling cannot be predicted from insecticidal activity, if any, of the repellent compound or composition. Clearly, it is apparent that an insecticide will function to kill insects which will result in dead insects at the precise place or area from which it may be desirable to repel them. A repellent will not permit contact of the insect with the area from which the insect is to be repelled. Therefore, it is clear that a repellent functions by filling a space or sphere around it with an aroma or satellite effect which keeps the insect from the place to be protected.

According to this invention, it has been found that conjugated diolefin amination products provide a new and effective means for repelling insects such as flies, mosquitoes, ants, and fleas from surfaces frequented by them, i. e., spheres of repellent influence or repellent satellite effect are formed by said products. We have further found that selected conjugated diolefin amination products are effective for repelling roaches from surfaces frequented by them while other selected products are attractants for roaches.

The materials of the present invention comprise the products obtained from the amination of conjugated diolefins such as 1,3-butadiene with ammonia or a suitable primary or secondary amine. A method for the production of these materials is disclosed and claimed in copending Serial No. 135,290, filed December 27, 1949, by John E. Mahan and Kenneth F. Bursack, now abandoned. A typical reaction of this nature comprises the amination of 1,3-butadiene with ammonia over a catalyst such as sodium hydride or sodamide at a temperature in the range 90–250° F., in liquid phase, the catalyst being present in an amount in the range 0.1 to 4 percent by weight of the reactants and the said reactants being present in a mol ratio of ammonia to 1,3-butadiene in the range 0.33:1 to 30:1, preferably 1:1 to 15:1 for a time of 5 minutes to 3 hours. Generally, the method for the production of the materials of the present invention comprises reacting a butadiene compound with a compound of the formula

wherein each R is selected from the group consisting of hydrogen, alkyl, aryl, aralkyl, alkaryl, cycloalkyl, heterocyclic, and these groups with substituents thereon inert to the reaction; and wherein both R's together are selected from the group consisting of a hydrocarbon radical forming a heterocyclic ring with the nitrogen nucleus and this group with substituents thereon inert to the reaction; the number of carbon atoms in both R's not exceeding a total of 36; said reaction taking place in the presence of a catalyst selected from the group consisting of sodamide and the alkali metal hydrides; and recovering from said reaction alkenylamines and a nitrogen-containing polymer.

Examples of some of the compounds which are suitable for reacting with a conjugated diolefin are: methylamine, N-methyl-propylamine, dibutylamine, aniline, diphenylamine, N-methylaniline, toluidines, benzylamine, morpholine, diisobutylamine, cyclohexylamine, cyclopropylamine, piperidine, nitroaniline, chloroaniline, xylidine, phenetidine, cresidine, anisidine, aminopyridine, aminothiazol, cumidine, mesidine, octylamine, amylamine, 1-ethoxyethylamine, etc. It has been found that the reactor effluent from the reaction of ammonia and a conjugated diolefin is composed of mono-, di- and tri-alkenylamines, unidentified higher boiling amines and small amounts of other unidentified materials. The reactor effluent can be employer per se for repelling flies, mosquitoes, fleas, and ants from surfaces frequented by them or the reactor effluent can be separated by fractional distillation or other suitable means and the fractions thereof used to repel flies, mosquitoes, fleas, and ants. When it is desired to repel roaches, however, selected fractions are employed for the practice of the present invention.

Conjugated diolefins and amines from which the products of the present invention can be prepared are fully set forth in above-mentioned Serial No. 135,290 filed December 27, 1949, by John E. Mahan and Kenneth F. Bursack. This reaction may be made to take place at atmospheric temperatures and higher and with relatively short contact times by the use of sodamide or an alkali metal hydride such as sodium hydride or lithium hydride as catalyst. (See Table I below.) For example, when 1,3-butadiene is reacted with ammonia in the presence of one of the above catalysts that mono-, and/or di-, and/or tri-2-butenylamines plus polymeric non-basic nitrogen-containing material are produced without the necessity of refrigeration and in a very reasonable length of time.

*Table I*

| Run # | Catalyst | Temp., °F. | Time, Hours | Yield, wt. percent C₄H₆ Charged Butenyl-amines | High Boiling Amines |
|---|---|---|---|---|---|
| 1 | NaH | 175 | 2.0 | 17.0 | 10.4 |
| 2 | NaNH₂ | 190 | 2.0 | 13.5 | 15.2 |
| 3 | LiH | 250 | 4.0 | 9.1 | 22.0 |
| 4 | KNH₂ | 250 | 4.0 | none | none |

In the amination of butadiene with ammonia apparently the monoalkenyl amine is the primary reaction product and the di- and tributenylamines are formed by reaction of this material with additional diolefin. Experiments have further borne out the fact that the dialkenylamine is very reactive. The non-basic material in the reaction product is formed at least partly from the trialkenylamine.

Table II which follows shows the very interesting trend of yield versus reaction time in the production of butenyl-amines from the reaction of ammonia and butadiene using a constant temperature (95–96° F.) and sodium hydride catalyst. Note that as the contact time and conversion are shortened the per cent of yield of amines is considerably increased. In view of this it is obvious that in a continuous process the per-pass rate of conversion should be kept low along with a relatively short contact time particularly when it is desirable to produce mono- or dibutenylamines.

Table II

| Run # | Time, Minutes | Yield, Wt. Percent based on C₄H₆ Consumed | | | Higher Boiling Amine | Non-Basic Material | Conversion of C₄H₆ |
|---|---|---|---|---|---|---|---|
| | | Mono-butenyl-Amine | Dibu-tenyl-Amine | Tribu-tenyl-Amine | | | |
| 4 | 180 | 8.9 | | 16.6 | 10.2 | 56.6 | 89.4 |
| 5 | 90 | 13.6 | 1.8 | 16.0 | 10.4 | 51.6 | 87.0 |
| 6 | 30 | 17.0 | 2.4 | 26.4 | 21.7 | 59.0 | 46.8 |
| 7 | 15 | 26.5 | 12.0 | 24.7 | 22.9 | 27.0 | 14.8 |
| 8 | 7.5 | 30.4 | 16.3 | 23.1 | 14.4 | 30.4 | 4.1 |

The following table, Table III, further bears out the conclusions drawn from the data listed in Table II. The runs listed in this table are quite similar to those of Table II except that the temperatures of the amination reactions were varied. The same catalyst, sodium hydride, was used throughout. As the temperature was increased the percentage yield of amine product was concomitantly reduced. Futher, by comparing runs 10 and 11 it is seen that at the short contact time of run 11 a greater overall yield of amines was obtained than at a longer contact time for the same temperature.

Table III

| Run # | Time, Minutes | Temp., °F. | Yield, Wt. Percent based on C₄H₆ Consumed | | | Higher Boiling Amines | Non-Basic Material | Conversion of C₄H₆ |
|---|---|---|---|---|---|---|---|---|
| | | | Mono-butenyl-Amine | Dibu-tenyl-Amine | Tribu-tenyl-Amine | | | |
| 9 | 30 | 80.5 | 23.7 | 9.6 | 25.3 | 25.3 | 36.9 | 23.3 |
| 10 | 30 | 130 | 13.4 | 3.1 | 14.5 | 16.8 | 66.8 | 89.0 |
| 11 | 10.5 | 130 | 20.1 | 5.0 | 18.0 | 18.0 | 49.3 | 49.3 |

From Table II one may readily see that as the contact time is lengthened greater quantities of non-basic materials, at least a portion of which are polymerization products, are made. By non-basic materials we mean materials containing about 5 per cent or less of nitrogen. Inasmuch as it was thought that this non-basic material might be similar to that formed by sodium polymerization of butadiene, a run was made without ammonia or an amine being present, using sodium hydride as the catalyst. No polymer was formed, which indicates that the non-basic material is different from the product of sodium polymerization.

1,3-butadiene and substituted 1,3-butadiene referred to in this specification are those compounds conforming to the following limitations. They may be any compound of the following general formula:

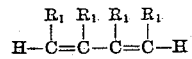

wherein one or more of the $R_1$'s may be hydrogen or $C_1$ to $C_4$ alkyl groups in which the total number of carbon atoms in said $R_1$'s does not exceed 12, and wherein one $R_1$ may be a phenyl or a substituted phenyl group, an alkoxy, $NO_2$, CN or any other group which is inert and unreactive in the present reaction. Examples of such substituted 1,3-butadienes are isoprene (2-methyl-1,3-butadiene), piperylene (1,3-pentadiene), 1-phenyl-1,3-butadiene, 2,3-dimethyl-1,3-butadiene, and 2-nitro-1,3-butadiene. The term butadiene compounds when used in this specification and claims is to include all of the above compounds, also butadiene itself.

According to the process 1,3-butadiene or one of the above described 1,3-butadiene compounds is admixed with a compound of the formula

described hereinabove, in a mol ratio of the nitrogen compound to butadiene in the range of 0.33:1 to 30:1. Generally, it may be considered that a preferred range is 1:1 to 15:1. Admixed with the butadiene compound and nitrogen compound, which is ammonia or which may be considered to be a substituted ammonia, is a catalyst selected from the group consisting of alkali metal hydrides and sodamide comprising 0.05 to 15 weight per cent of the materials charged, but preferably 0.1 to 4 weight per cent of these materials. This admixture is then heated to a temperature in the range of 50 to 500° F. The reaction pressure will be such that the reaction mixture will be maintained substantially in the liquid phase. At the reaction temperature, the pressure will usually be at least in the range of 180 to 1200 pounds per square inch gauge.

Often it is preferred that the temperatures and pressures are in the range of 90 to 250° F. and 180 to 1000 pounds per square inch gauge. Generally, however, higher temperatures are preferred when the material reacting with the conjugated diolefin is an amine rather than ammonia. The admixture is maintained at the desired temperature and pressure for a period of time in the range of 1 minute to 25 hours, but preferably in the range of 5 minutes to 10 hours, depending on whether ammonia or an amine is used as one of the reactants. Usually a somewhat longer reaction time is necessary when the amines are used instead of ammonia. Often when using ammonia quite short reaction times may be used such as in the range of 5 minutes to 3 hours. Suitable means for agitating the admixture are employed which may be any conventional mechanical stirring apparatus.

After the conjugated diolefin such as butadiene and the nitrogen-containing compound have reacted for an adequate time in contact with one or a combination of the catalysts described herein, the reaction effluent is passed to suitable separating means, such as fractional distillation columns or the like, where unchanged reactants are removed for recycling and where the alkenylamines are recovered. The product of the process may include three distinct amines; monoalkenylamines, dialkenylamines, and trialkenylamines with the double bond in each case in the 2 position in the butadiene nucleus, in addition to higher boiling amines and non-basic nitrogen-containing polymer.

For example, if a butadiene compound is reacted with ammonia, such as in the following equation

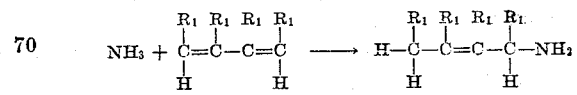

1,4 addition takes place and the corresponding 2-butenylamine is formed.

Suitable equipment for carrying out the process is that which will withstand the process temperatures and pressures, and which is equipped with suitable means of agitation. Such equipment is well known to those skilled in the art. For example, an autoclave built to withstand pressures of 1200 pounds per square inch and better, and equipped with adequate heating apparatus and stirring mechanism will be very satisfactory.

While the process is described with particular reference to batchwise operation, the reaction may also be carried out in a continuous operation when desired. Such an embodiment presents definite advantages in large scale operation, and is to be considered within the scope of the invention. A typical amination run wherein 1,3-butadiene was reacted with anhydrous ammonia in the liquid phase in the presence of sodium hydride is described as follows:

A pressure reactor of 1400 cc. capacity was carefully cleaned and dried and purged of air with nitrogen. The catalyst and reactants were charged to the reactor, said reactor warmed to room temperature quickly and then placed in a 96° F. water bath. Results of the run are given below:

*Table IV*

| | |
|---|---:|
| Temperature, ° F | 96 |
| Duration hours | 0.5 |
| Charge, grams: | |
|   Sodium hydride | 1.0 |
|   Ammonia | 416.0 |
|   1,3-butadiene | 109.4 |
| Material recovered, grams: | |
|   Ammonia | 384.3 |
|   1,3-butadiene | 58.2 |
|   A. Material which formed water-soluble hydrochlorides with hydrochloric acid: | |
|     Monobutenylamine | 8.7 |
|     Dibutenylamine | 2.2 |
|     Tributenylamine | 13.5 |
|     High boiling amines | 11.1 |
|   B. Nitrogen-containing material which did not react with hydrochloric acid to form water-soluble hydrochlorides | 30.2 |

The products were recovered from the reaction mixture from a typical run as follows: First, unreacted butadiene and ammonia were weathered off and recovered. Cracked ice was added to the remaining liquid which was then acidified, to neutralize the amines, by adding a slight excess of hydrochloric acid. This mixture was then extracted with ether to remove the products which did not react with the acid. This portion of the product was recovered by flashing off the ether.

Following the ether extraction, the acidic, aqueous solution was made strongly alkaline. The basic materials, i. e., the mixture of amines and high boiling basic products formed during the reaction were then extracted with ether. After drying the ether extract, the ether was flashed off, and then the basic product of said mixture of amines and high boiling basic products formed during the reaction was fractionated to separate the various butenylamines and high boiling basic products.

The recovered materials as identified above, i. e., the monobutenylamine fraction, the dibutenylamine fraction, the tributenylamine fraction, and the high boiling amines fraction, from several such typical runs were combined to form a sizable composite of each fraction.

A portion of the said composite of the high boiling amines fraction which boil above tributenylamine and which form water soluble hydrochlorides when reacted with hydrochloric acid, was further fractionated into eleven fractions as follows, for use in repellency tests.

*Table V*

Fraction 1—B. P. 145.4 to 194° F. at 4.8 to 2.6 mm.
Fraction 2—B. P. 194 to 225.5° F. at 2.6 mm.
Fraction 3—B. P. 225.5 to 232.7° F. at 2.8 mm.
Fraction 4—B. P. 232.7 to 242.6° F. at 2.8 mm.
Fraction 5—B. P. 242.6 to 253.4° F. at 2.8 mm.
Fraction 6—B. P. 253.4 to 266.9° F. at 3.2 mm.
Fraction 7—B. P. 266.9 to 279.5° F. at 3.4 mm.
Fraction 8—B. P. 279.5 to 285.4° F. at 3.7 mm.
Fraction 9—B. P. 285.4 to 291° F. at 4.0 mm.
Fraction 10—B. P. 291 to 307.4° F. at 3.7 mm.
Fraction 11—B. P. 307.4 to 316.4° F. at 3.7 mm.

The materials of the present invention are valuable and highly effective for repelling insects such as flies, mosquitoes, ants, and fleas from surfaces frequented by them when applied to said surfaces in suitable form, such as solution, powder, lotion, emulsion, aerosol, or the like, or per se. By way of example, we have found that it is convenient to dissolve the fraction identified as high boiling amines which form water soluble hydrochlorides in a suitable solvent, or otherwise employ it in a suitable carrier and apply the compositions so formed to a surface from which said insects are to be repelled or to an area adjacent to such a surface. Solvents or carriers applicable to the present invention include those which have no detrimental effect on the repellency of our materials. Solvents which are useful for this purpose include isoparaffinic hydrocarbon fractions, acetone, ethyl acetate, diethyl ether, an alcohol such as ethyl or isopropyl, benzene and the like. The present materials may also be suitably emulsified in water. Solid, inert carrier materials such as talc, kieselguhr, and the like are employed when preparing powders.

When employing our repellent materials in a non-volatile solvent or inert powder carrier, it is usually preferred that the concentration of the active ingredient be not less than about 0.5 per cent by weight. There is no upper limit to the concentration that can be employed, except that dictated by economy, or the limit of solubility in a given solvent. In certain instances, it will be found advantageous to apply our repellents per se.

The repellent materials of our invention can be applied for their intended purpose in several ways. The most advantageous and presently preferred method of application is to spray a liquid composition, preferably containing a volatile solvent, on or near a surface from which insects are to be repelled. Generally, about 1 to 10 grams of the active ingredient per hundred square feet of surface is advantageously applied.

We have surprisingly found, as stated, that selected materials of the present invention are effective repellents for American roaches *Periplaneta americana*. These materials include Fraction 11 obtained on refractionation of the high boiling amines which form water soluble hydrochlorides, referred to above in Table IV. In view of the fact that this mixture of high boiling amines is an excellent fly repellent and an attractant for roaches, it is surprising that Fraction 11 is a repellent for roaches. The properties of these materials are compared in Example III to demonstrate our unexpected discovery.

*Example I*

In accordance with the sandwich bait method described by L. B. Kilgore in Soap, June 1939, several 1″ x 4″ strips of cardboard were coated with a smooth, thin film of unsulfured molasses leaving an uncoated margin of about ¼″ on all four sides. The prepared cardboard strips were then oven-dried at 45° C.

Highly porous paper strips, cut from cushion sheets used in mimeograph stencils, were impregnated with varied amounts of the candidate repellent. Impregnation of the porous strips was effected by immersing them in an acetone solution of the repellent and then allowing the strips to dry over a period of 4 to 6 hours. The impregnated strips were the same size as the baited cardboards. An impregnated strip was superimposed on each baited cardboard and fastened in place by stapling. The loose fiber construction of the impregnated paper permits the flies to remove the molasses therethrough.

The prepared strips, i. e., the sandwich baits, were then exposed to house flies, *Musca domestica*, over 5 days old, which had been starved for six hours. Counts of the number of flies feeding on the strips were taken at intervals over a 2½ hour period. A non-repellent material in the sandwich bait becomes black with flies soon after being exposed and the bait will often be completely consumed in five minutes.

Results of tests using four materials obtained from the reaction of butadiene with ammonia and one material separated from the product obtained on reacting butadiene with n-butylamine are recorded in the following table:

| Compound | Concn., percent | Number of Flies Feeding | | | | | | | |
|---|---|---|---|---|---|---|---|---|---|
| | | 5 min. | 15 min. | 30 min. | 45 min. | 60 min. | 90 min. | 120 min. | 150 min. |
| Tributenylamine | 10 | 0 | 0 | 0 | 0 | 0 | 0 | 0 | 0 |
| Amines which boil above tributenylamine and which form water-soluble hydrochlorides when reacted with hydrochloric acid | 10 | 0 | 0 | 0 | 0 | 0 | 0 | 0 | 0 |
| | 5 | 0 | 0 | 0 | 0 | 0 | 0 | 0 | 1 |
| | 2.5 | 0 | 0 | 0 | 0 | 0 | 2 | 1 | 9 |
| | 1.0 | 0 | 1 | 6 | 9 | 15 | 12 | [1] gone | |
| Nitrogen-containing material which did not react with hydrochloric acid to form water-soluble hydrochlorides | 10 | 0 | 0 | 0 | 0 | 1 | 1 | 0 | 0 |
| Basic distillation pot residue | 5 | 0 | 0 | 0 | 0 | 0 | 0 | 1 | 0 |
| Material obtained from the interaction of butadiene with n-butylamine which boils above 250° C. at 1 atmosphere pressure | 5 | 0 | 0 | 0 | 0 | 0 | 0 | 0 | 0 |
| | 2.5 | 0 | 1 | 0 | 0 | 0 | 0 | 0 | 0 |
| | 1.25 | 0 | 0 | 0 | 0 | 0 | 0 | 0 | 0 |
| | .625 | 0 | 0 | 0 | 0 | 0 | 0 | 0 | 0 |
| | .31 | 0 | 0 | 3 | 4 | 2 | 1 | 5 | 3 |
| | .15 | 1 | 0 | 11 | 5 | 5 | 1 | 0 | [1] gone |

[1] Molasses consumed.

To prepare for the test the last material listed in the immediately preceding table butadiene was reacted with mono-n-butylamine in the presence of sodium hydride at a temperature of 250° F. for a period of three hours and under autogenous pressure. The reaction vessel was cooled to room temperature and unreacted materials were weathered off and collected in a Dry Ice trap. The reaction mixture was then distilled at 1 atmosphere pressure until materials boiling up to and including 250° C. were removed.

The foregoing results demonstrate the excellent repellency of the materials of the present invention. Compounds which provide substantially complete repellency for a period of 90 minutes according to the above test, in concentrations of 10 per cent or less, are considered highly efficacious repellents. It will be noted that most of the materials tested provided a high degree of repellency at concentrations of 10 per cent or lower.

*Example II*

A semi-practical test was conducted in a small room wherein flies were confined. It was noted that flies congregated on the windows of this room no matter what the light intensity on either side of the glass. In testing our fly repellents, these windows were cleaned and then sprayed with a 1 weight per cent acetone solution of the candidate repellent to provide about 0.02 gram of repellent per square foot of glass. After the solvent had evaporated flies were introduced into the room. Samples of (a) the material obtained from the condensation of butadiene and ammonia which boils above tributenylamine and which forms water soluble hydrochlorides when reacted with hydrochloric acid and (b) material from the interaction of 1,3-butadiene with normal butylamine which boils above 250° C. at 1 atmosphere pressure substantially completely repelled flies from the windows for a period of 96 hours. At the end of two weeks, the materials retained approximately 80–90 per cent of their initial repellency. Each material was tested separately.

*Example III*

The chemotropic effect of materials on roaches was determined by taking advantage of the fact that roaches seek shelter from light. Ten roaches, usually young adults, were confined in a screened cage which contained two shelters, one treated with a candidate repellent and one untreated. These shelters were inverted lidless one pint paper cartons with notches cut in the rim to allow entrance to the roaches. One cc. of a one per cent solution of the chemical was put in one carton with 5 cc. of acetone to help distribute it. The carton was revolved until the inside was evenly coated and the acetone had evaporated.

If the chemical was repellent the roaches gathered in the untreated carton. If it was attractive the roaches gathered in the treated carton.

Using concentrations of 10 mg. per carton, tests were set up according to the procedure described above and observations made at 24, 48, 72 and 96 hours. Results of tests are recorded below:

| Material | (A) Amines which boil above tributenylamine and which form water-soluble hydrochlorides when reacted with hydrochloric acid | (B) Fraction 11 from distillation of the amines which boil above tributenylamine and which form water-soluble hydrochlorides | (C) Basic distillation pot residue |
|---|---|---|---|
| Concentration, mg | 10 | 10 | 10 |
| 24 hours: | | | |
| Treated | 10 | 0 | 0 |
| Untreated | 0 | 10 | 10 |
| Loose in cage | 0 | 0 | 0 |
| 48 hours: | | | |
| Treated | 10 | 1 | 0 |
| Untreated | 0 | 9 | 10 |
| Loose in cage | 0 | 0 | 0 |
| 72 hours: | | | |
| Treated | 10 | 1 | 0 |
| Untreated | 0 | 9 | 10 |
| Loose in cage | 0 | 0 | 0 |
| 96 hours: | | | |
| Treated | 10 | 0 | 0 |
| Untreated | 0 | 8 | 10 |
| Loose in cage | 0 | 2 | 0 |

The foregoing results clearly demonstrate the repellent properties of materials listed as B for American roaches *Periplaneta americana*. The foregoing results also demonstrate our surprising discovery that while the material which boils above tributenylamine and forms water soluble hydrochlorides is an attractant for roaches, it contains a material, Fraction 11, which is an effective roach repellent.

Reasonable modification and variation are possible within the scope of the foregoing disclosure and appended claims to the invention the essence of which is that certain amination products of conjugated diolefins have been discovered to possess excellent general insect repellency and that certain amination products of conjugated diolefins have been found to be attractants for the well-known American roach while certain others were found to be excellent repellents for said well-known roach. Thus it is within the scope of the invention, disclosure and appended claims to employ the attractant fraction, i. e. the high boiling amines fraction, together with a roach killer to attract away from an area to be protected against roach infestation said roaches and to thus kill them.

We claim:

1. A composition suitable for the prevention of infestation of a roach habitat by roaches, containing as an essential active ingredient thereof a higher boiling amine product boiling in the range 307.4 to 316.4° F. at 3.7 millimeters of mercury, and a roach repellent adjuvant as a carrier therefor, which product has been prepared by reacting ammonia and 1,3-butadiene employing a catalyst selected from the group consisting of alkali metal hydrides and sodamide at a temperature within the range of 50 to 500° F., in liquid phase, said catalyst being present in an amount within the range of 0.05 to 15 weight per cent of said reactants which are present in a ratio of 0.33:1 to 30:1 ammonia to 1,3-butadiene for a period of 5 minutes to 3 hours and fractionally distilling the reaction product thus obtained to separate said higher boiling amine product.

2. A method for preventing roaches from infesting a roach habitat which comprises applying to said roach habitat in an amount sufficient to effectively repel said roaches an amination product boiling in the range 307.4 to 316.4° F. at 3.7 millimeters of mercury, and having been prepared by reacting ammonia and 1,3-butadiene employing a catalyst selected from the group consisting of alkali metal hydrides and sodamide at a temperature within the range of 50 to 500° F., in liquid phase, said catalyst being present in an amount within the range of 0.05 to 15 weight per cent of said reactants which are present in a ratio of 0.33:1 to 30:1 ammonia to 1,3-butadiene for a period of 5 minutes to 3 hours and fractionally distilling the reaction product thus obtained to separate said amination product.

3. A method for repelling roaches from a roach habitat which comprises applying to an area adjacent to the said habitat from which the roaches are to be repelled, in an amount sufficient to effectively repel said roaches, an amination product boiling in the range 307.4 to 316.4° F. at 3.7 millimeters of mercury and having been prepared by reacting ammonia and 1,3-butadiene employing a catalyst selected from the group consisting of alkali metal hydrides and sodamide at a temperature within the range of 50 to 500° F., in liquid phase, said catalyst being present in an amount within the range of 0.05 to 15 weight per cent of said reactants which are present in a ratio of 0.33:1 to 30:1 ammonia to 1,3-butadiene for a period of 5 minutes to 3 hours and fractionally distilling the reaction product thus obtained to separate said amination product.

References Cited in the file of this patent

UNITED STATES PATENTS

| | | |
|---|---|---|
| 2,501,509 | Gresham | Mar. 21, 1950 |
| 2,501,556 | Witman | Mar. 21, 1950 |
| 2,518,528 | Danforth | Aug. 15, 1950 |

FOREIGN PATENTS

| | | |
|---|---|---|
| 662,431 | France | Mar. 19, 1929 |
| 313,934 | Great Britain | June 14, 1929 |

OTHER REFERENCES

Shepard, Harold H.: Chemistry and Action of Insecticides, 1st ed., 1951, pp. 466 to 471.